(12) United States Patent  (10) Patent No.: US 8,358,321 B1
Weidner  (45) Date of Patent: Jan. 22, 2013

(54) CHANGE SCREEN ORIENTATION

(75) Inventor: Klaus Weidner, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/097,558

(22) Filed: Apr. 29, 2011

(51) Int. Cl.
*G09G 5/00* (2006.01)
(52) U.S. Cl. .................. 345/659; 345/649; 345/619
(58) Field of Classification Search .................. 345/649, 345/659, 619
See application file for complete search history.

(56) References Cited

U.S. PATENT DOCUMENTS

| | | | |
|---|---|---|---|
| 6,931,596 B2* | 8/2005 | Gutta et al. | 715/728 |
| 7,706,579 B2* | 4/2010 | Oijer | 382/118 |
| 2006/0279552 A1* | 12/2006 | Tonouchi | 345/173 |
| 2009/0009469 A1* | 1/2009 | Hsu et al. | 345/158 |
| 2009/0085881 A1* | 4/2009 | Keam | 345/173 |
| 2009/0097705 A1* | 4/2009 | Thorn | 382/103 |
| 2010/0066667 A1* | 3/2010 | MacDougall et al. | 345/156 |
| 2010/0066763 A1* | 3/2010 | MacDougall et al. | 345/656 |
| 2011/0001762 A1* | 1/2011 | Li et al. | 345/649 |
| 2011/0032220 A1* | 2/2011 | Shih et al. | 345/204 |
| 2011/0193883 A1 | 8/2011 | Palais et al. | |
| 2012/0081392 A1* | 4/2012 | Arthur | 345/633 |

\* cited by examiner

*Primary Examiner* — Michelle L Sams
(74) *Attorney, Agent, or Firm* — Troutman Sanders LLP; James E. Schutz; Edward M. Roney

(57) ABSTRACT

A method, computer program product, and system are provided for orienting content on a display. The method may include identifying one or more features of a user in a captured image. A user orientation axis is determined in the captured image. A content orientation axis corresponding to an orientation direction of a screen content is defined. A determination is made as to whether the content orientation axis and the user orientation axis are parallel or perpendicular. The orientation direction of the screen content is changed to be substantially along the user orientation axis based on the determination of whether the content orientation axis and the user orientation axis are parallel or perpendicular. The screen content is then displayed.

18 Claims, 11 Drawing Sheets

FIG. 1A
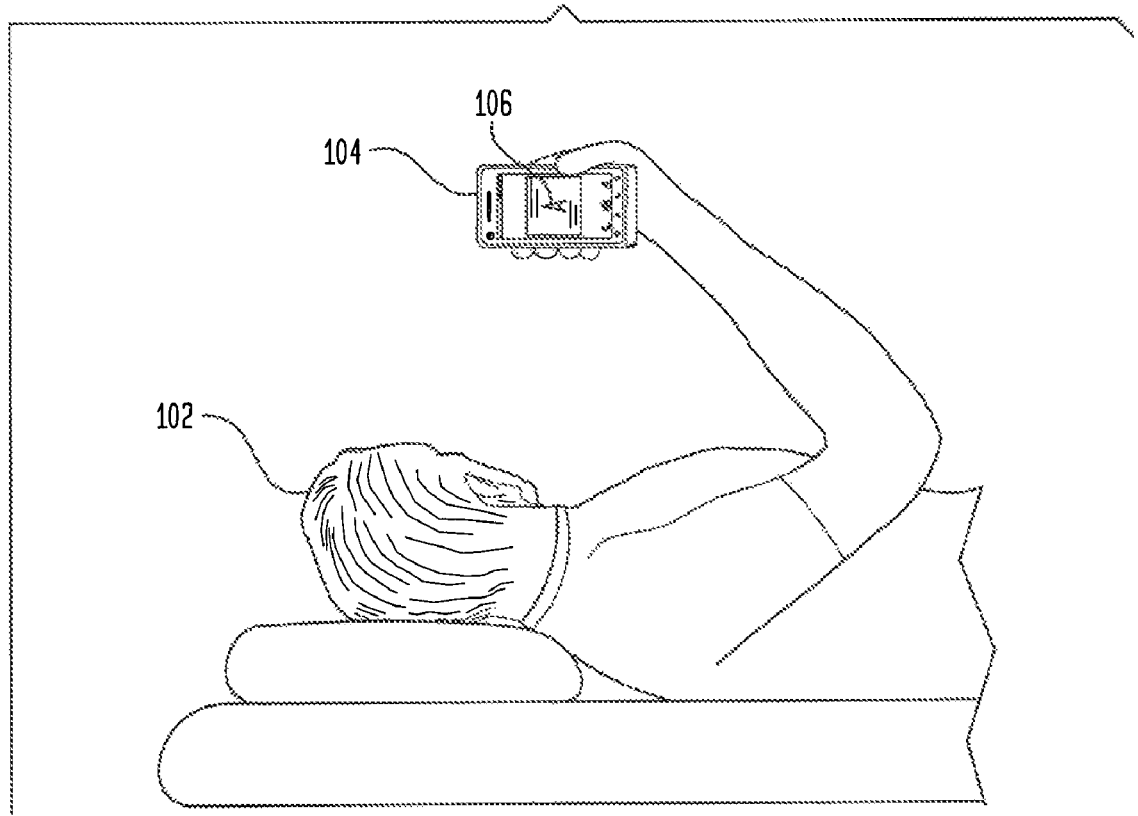
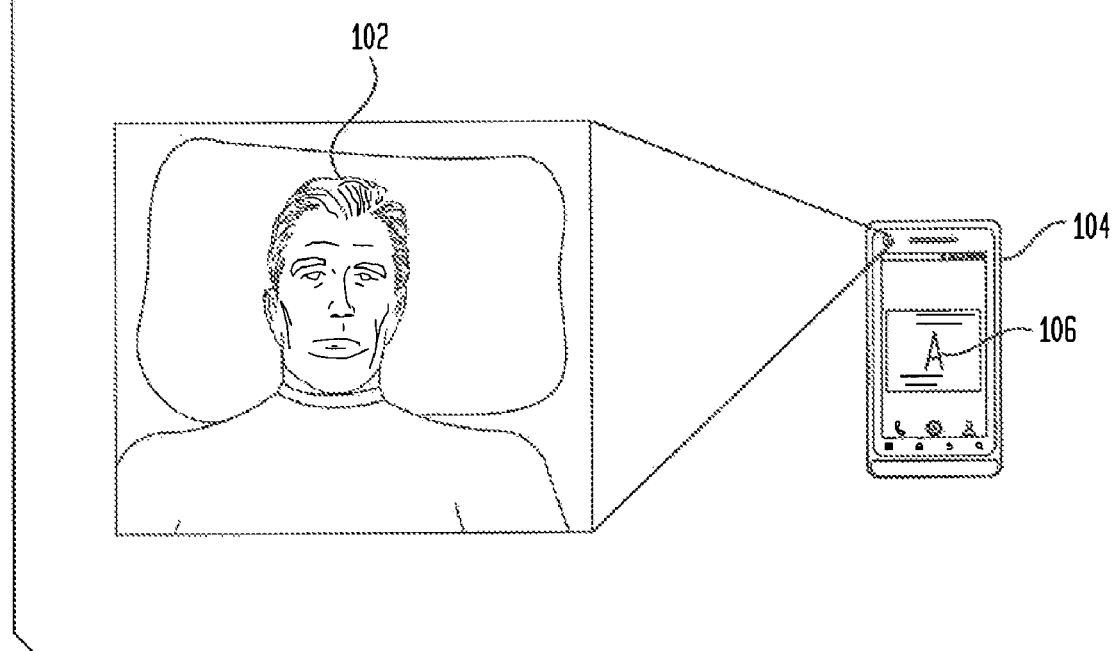

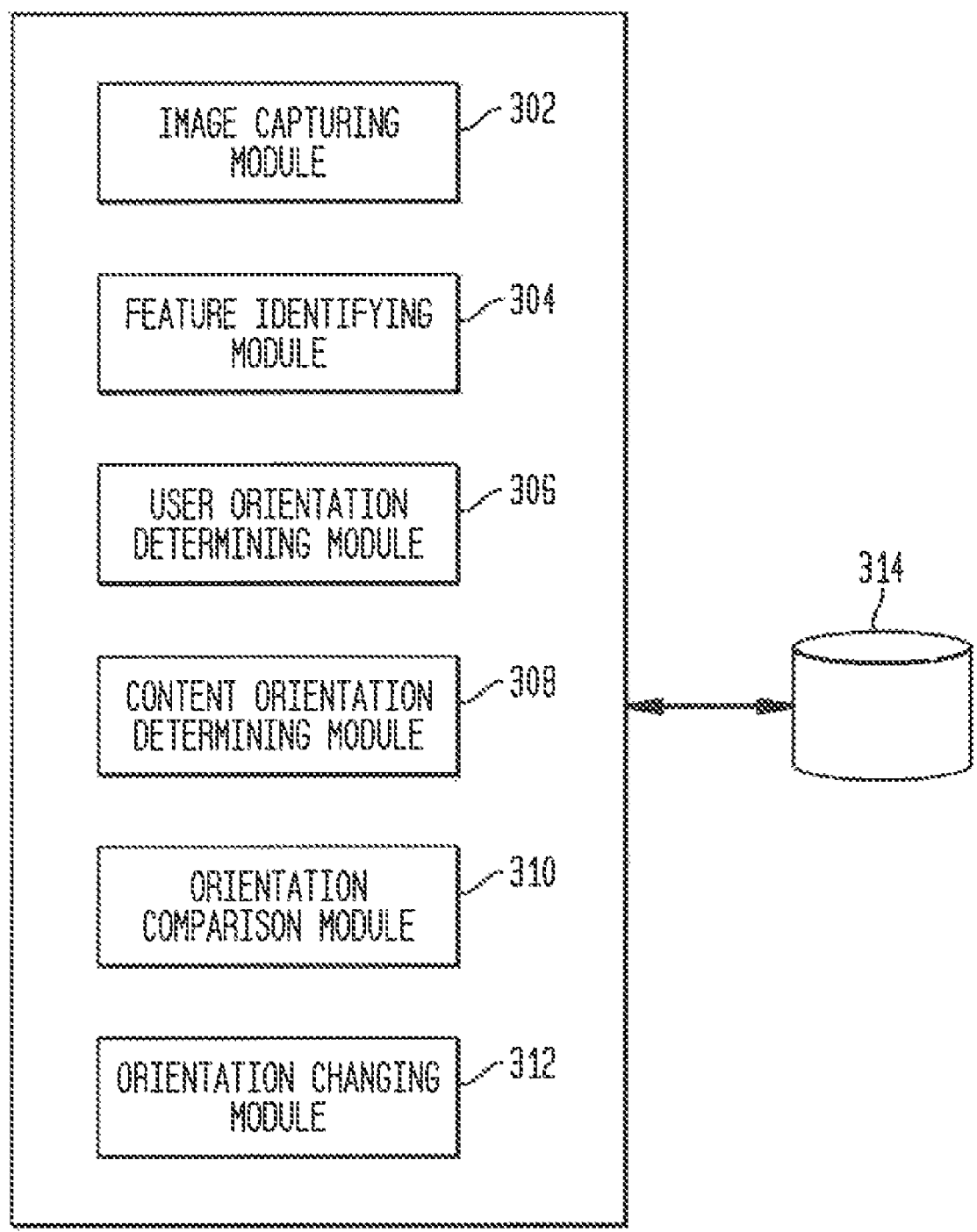

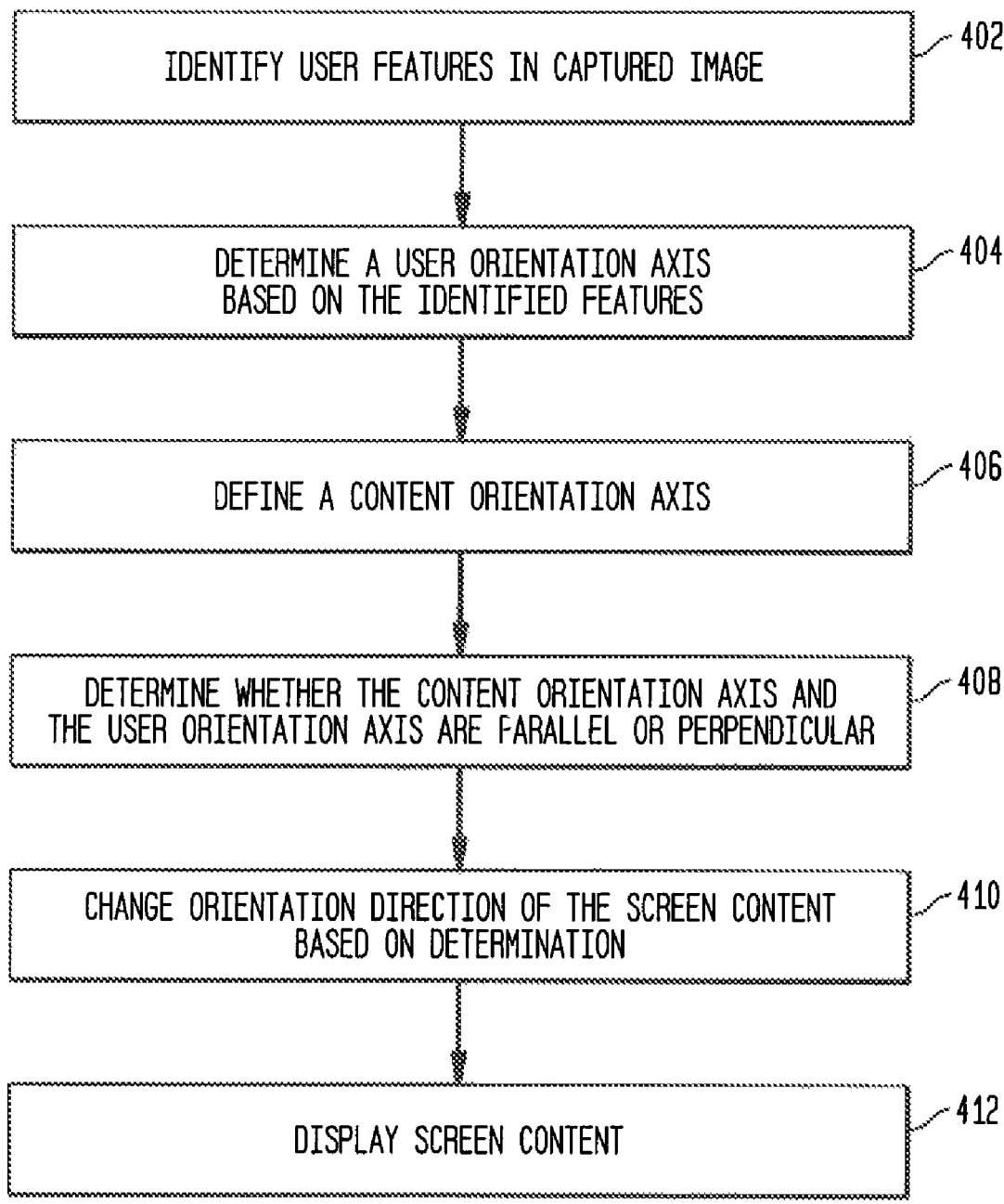

CHANGE SCREEN ORIENTATION

BACKGROUND

Display systems play a prominent role in the design of many electronic devices. For example, notebook computers, personal digital assistants (PDAs), satellite navigation devices, electronic book readers, and mobile phones each provide a display device for presenting content to a user. Typically, content is intended for viewing from a particular viewer orientation. Display systems may be configured to orient the display of content based on a detected orientation of the displaying device.

BRIEF SUMMARY

According to one aspect of the subject matter described by this specification, a method includes identifying one or more features of a user in a captured image on a mobile device, and determining a user orientation axis in the captured image. A content orientation axis corresponding to an orientation direction of a screen content is defined. A determination is made as to whether the content orientation axis and the user orientation axis are parallel or perpendicular. The orientation direction of the screen content is changed to be substantially along the user orientation axis based on the determination of whether the content orientation axis and the user orientation axis are parallel or perpendicular. The screen content is then displayed on the mobile device.

Other embodiments of these aspects include corresponding systems, apparatus, and computer programs, configured to perform the actions of the methods, encoded on computer storage devices.

Further features and advantages described herein, as well as the structure and operation of various embodiments, are described in detail below with reference to the accompanying drawings. It is noted that the following description is not limited to the specific embodiments described herein. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, illustrate embodiments and, together with the description, further serve to explain the principles herein and to enable a person skilled in the relevant art to make and use the embodiments described herein.

FIGS. 1A and 1B are illustrations of exemplary displays on a mobile phone;

FIG. 3 is a block diagram showing functions implemented by an exemplary content orientating system suitable for practicing embodiments described herein;

FIG. 4 is an example method for orienting displayed content;

DETAILED DESCRIPTION

Embodiments provide systems and methods for orienting content on a display device to facilitate viewing the content. Examples of content that can be oriented may include text in documents, moving content in video games or motion pictures, and still images in pictures, portraits or presentations. Embodiments detect the orientation of the user and of the provided content, and change the orientation with which the content is displayed according to the orientation of the user relative to the orientation of the display device.

FIG. 1A shows a user 102 lying on a bed while viewing content on an exemplary display device 104. The user 102 is lying on the side in bed, holding the device 104 so that the right device edge is pointing down. This is a portrait orientation from the user's point of view. The exemplary display device 104 lies on its side. A typical display might orient content 106 based on a detected orientation of the display device 104 resulting in content 106 not being displayed in the proper orientation for the viewer. The exemplary display detects the horizontal orientation of the user 102 and orients the content 106 on the display as shown in FIG. 1A. If the user 102 sits upright in bed, and does not move the display device 104, the display device will rotate the displayed content 106 as appropriate for viewing in the user's new position.

Embodiments may be used in environments where a gravity based orientation detector (e.g., an accelerometer) does not provide useful data for detecting orientation of a display device. For example, in a free fall environment, the force of gravity may not be detected by an accelerometer.

Figure 1B:
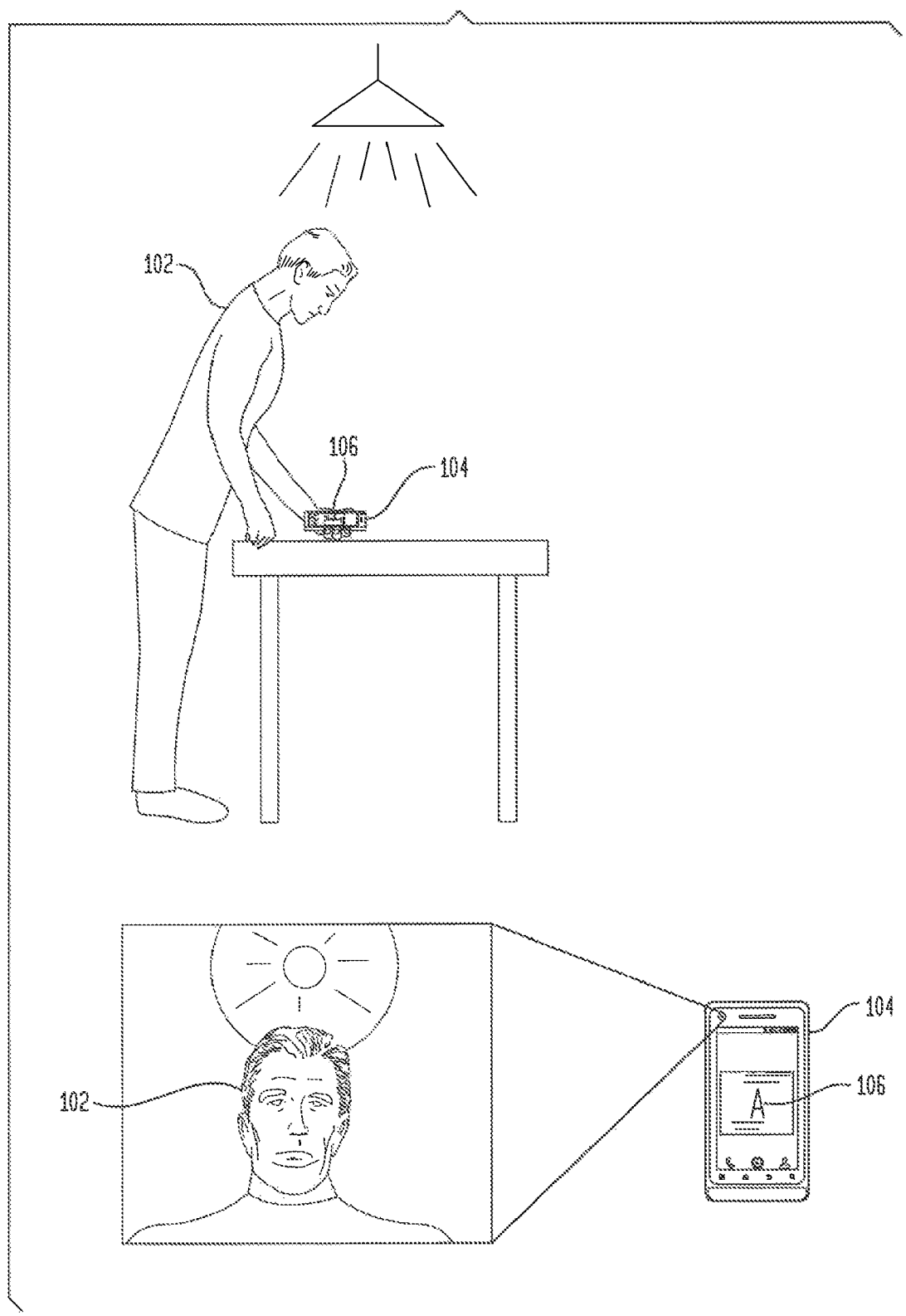

FIG. 1B shows an exemplary display device 104 according to an embodiment, lying on the horizontal surface of a table. The device 104 is lying flat on a table with the screen and the camera pointing directly upwards. The user 102 is standing next to the table looking down at the device 104.

A display that orients content 106 based on a detected orientation of the display device using an accelerometer or gyroscope, for example, would display the content 106 in a fixed orientation regardless of a viewer's orientation. The exemplary display device shown in FIG. 1B may be configured to detect the orientation of the viewer in a captured image and to orient the content 106 based on the orientation as shown in FIG. 1B. A camera on the display device can see the user's eyes are oriented parallel to the top edge of the device 104 and rotates the content 106 on the display to match. As the use 102 walks around the table, the exemplary display may be configured to capture new images of the viewer and to reorient the content 106 on the display for viewing by a user from various locations relative to the display.

The following detailed description refers to the accompanying drawings that illustrate exemplary embodiments. Other embodiments are possible, and modifications can be made to the embodiments within the spirit and scope of the detailed description.

It would be apparent to one of skill in the relevant art that the embodiments, as described below, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

Figure 2:
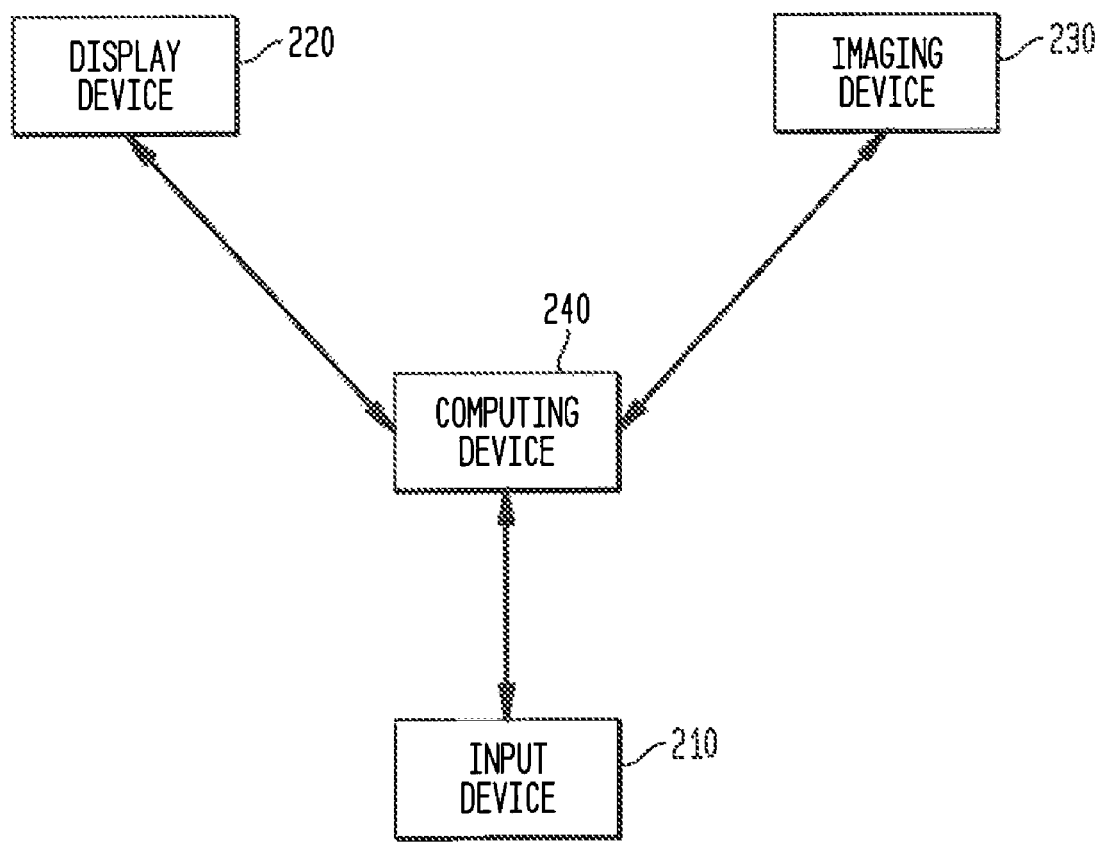
FIG. 2 is an illustration of an exemplary computer system in which embodiments described herein can be implemented.
Figure 5A:
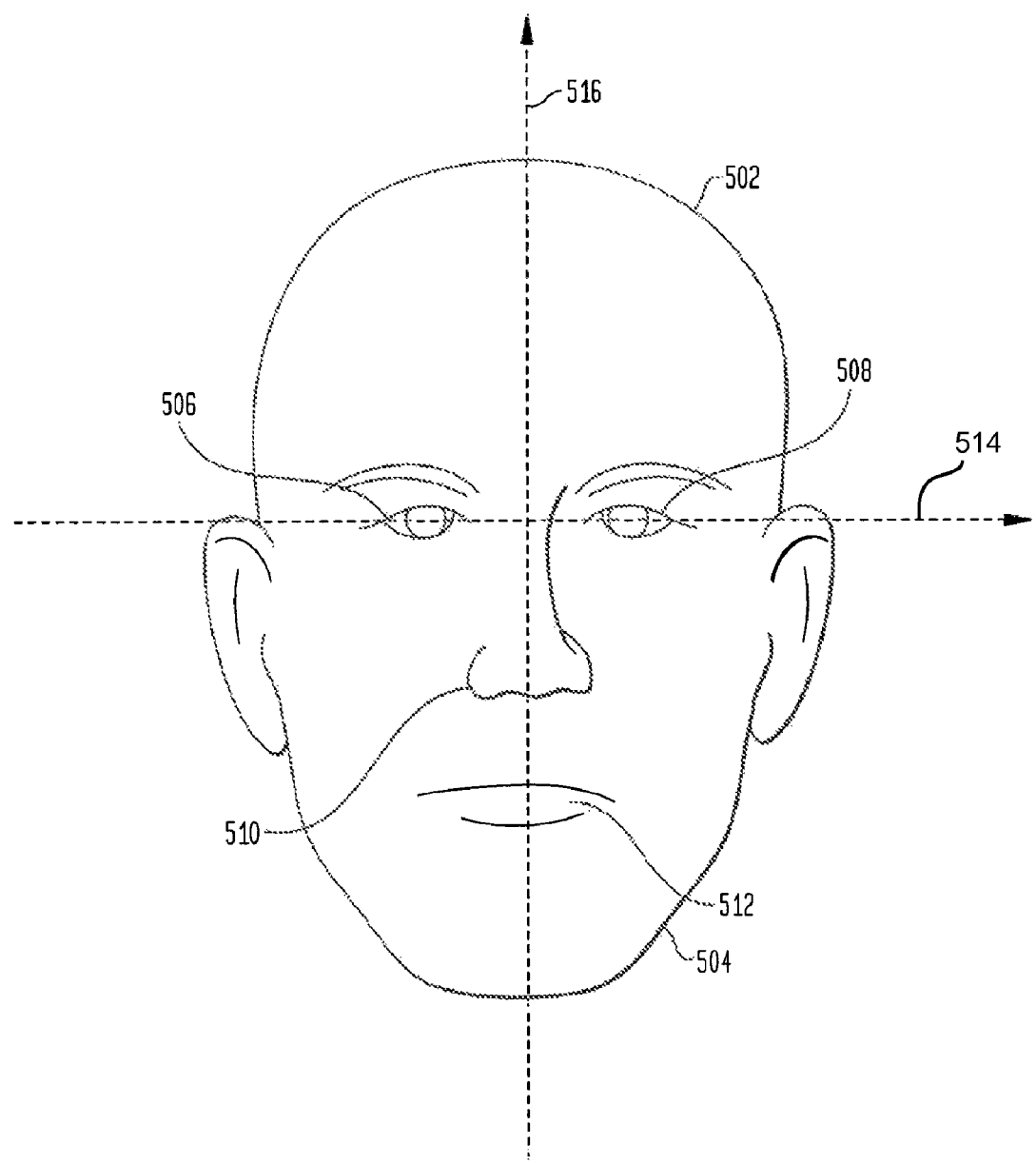
FIGS. 5A-5D illustrates example captured images suitable for practicing embodiments described herein.
Figure 5B:
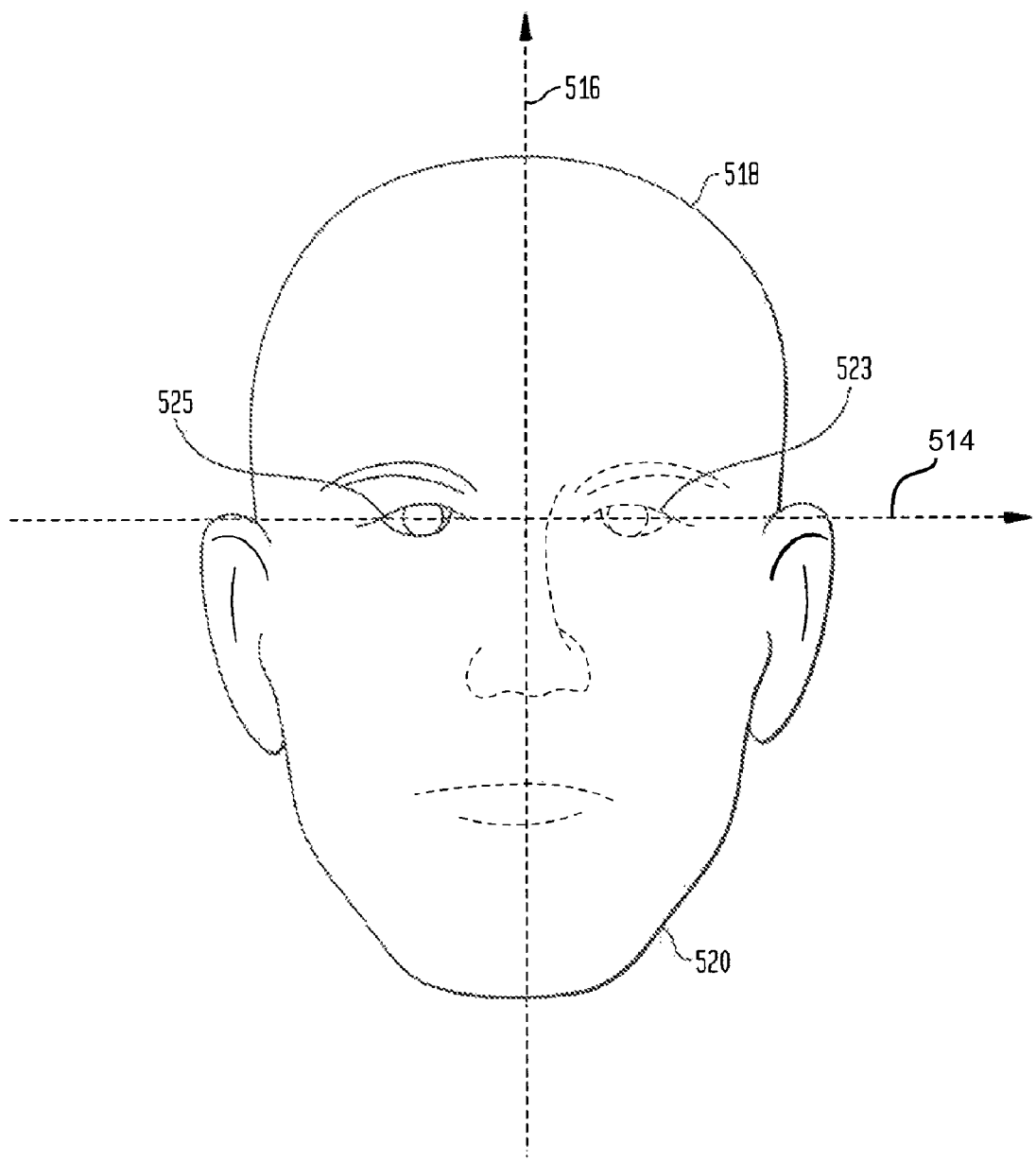
Figure 5C:
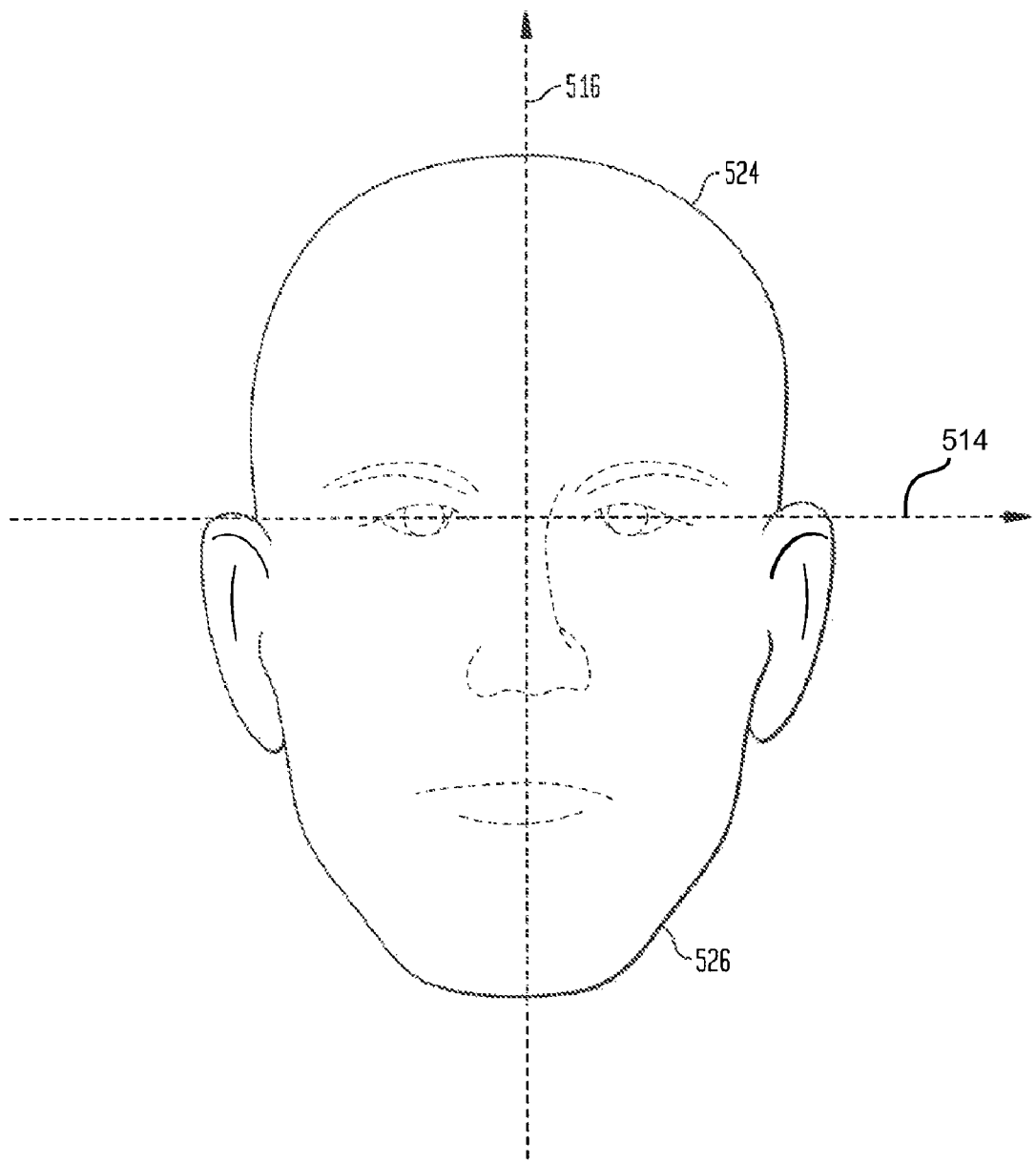
Figure 5D:
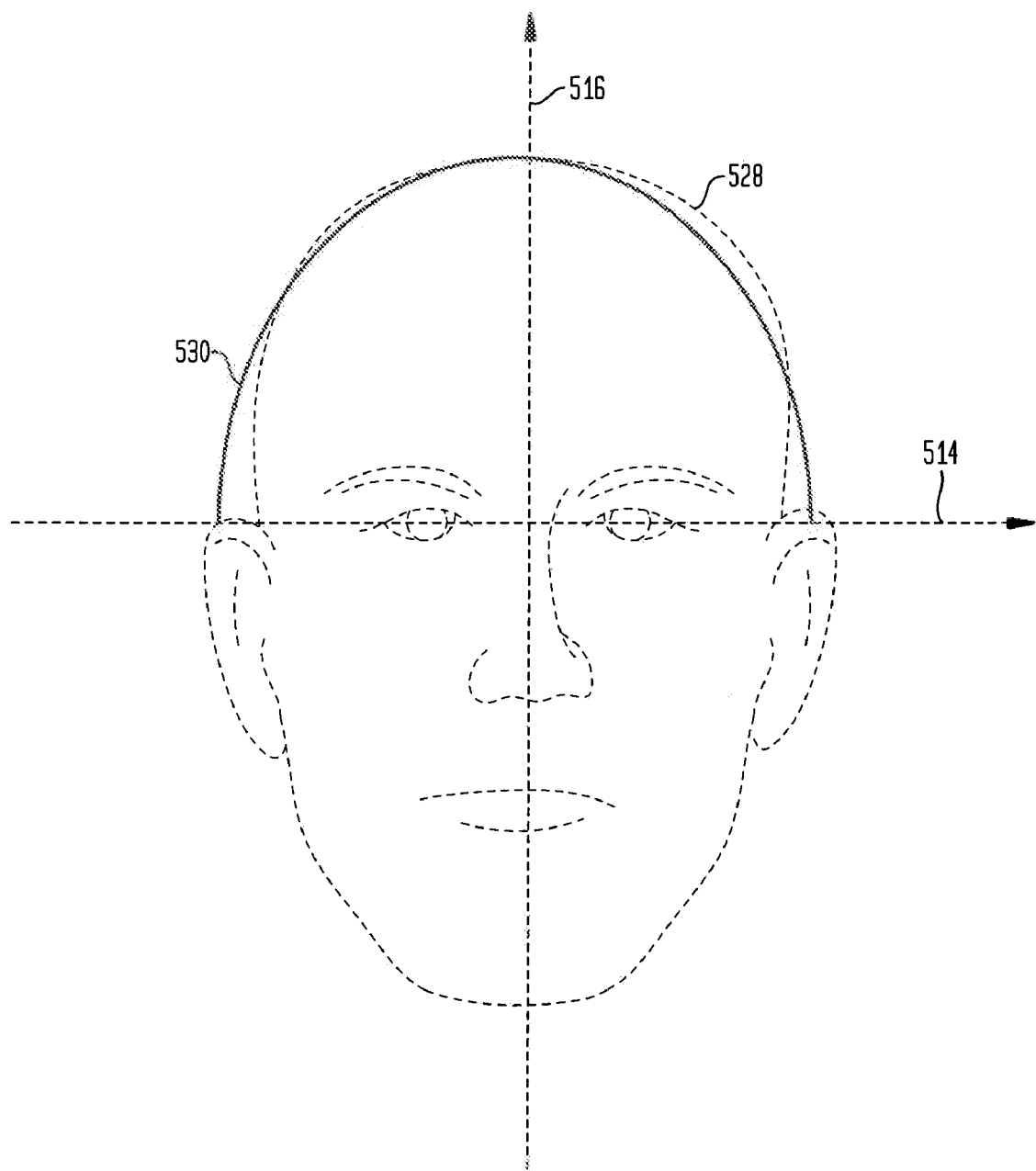

FIG. 2 is an illustration of an exemplary computer system 200 in which embodiments described herein can be implemented. Computer system 200 can be, for example and without limitation a personal computer system (e.g., desktop, laptop, tablet, and handheld computers), a personal digital assistant, a mobile phone, a consumer electronic device, and other similar types of electronic devices. Computer system 200 includes an input device 210, a display device 220, imaging device 230, and a computing device 240.

In one embodiment, computing device 240 is configured to execute instructions and to carry out operations associated with computer system 200. Computing device 240 can control the reception and manipulation of input and output data from input device 210 and display device 220. Computing device 240 can be implemented on a single computing device such as, for example and without limitation, a stand-alone device. Computing device 240 can be based on processing devices that include, but are not limited to, programmable logic arrays, application-specific integrated circuits, and central processing units that have at least one processor and memory. In another embodiment, computing device 240 can have multiple processors and multiple shared or separate memory components such as, for example and without limitation, one or more computing devices incorporated in a clustered computing environment or a server farm. The computing process can be performed by the clustered computing environment, or server farm, and may be carried out across multiple processors located at the same or different locations.

Display device 220 is operatively coupled to computing device 240. Display device 220 can be, for example and without limitation, a liquid crystal display, a plasma display, a computer monitor (e.g., a variable graphics array (VGA) display, a super VGA display, and a cathode ray tube display), and other similar types of display devices. In one embodiment, display device 220 can be configured to display a graphical user interface (GUI) that provides an interface between a user and computer system 200 or an application running on computer system 200 (also referred to herein as a "system application"). The system application can be, for example and without limitation, an email application, a multimedia display application, a document generating application, or a video game. Features of the GUI for the system application can be arranged in a predefined layout on display device 220 or can be generated dynamically to serve specific actions taken by the user. For instance, the GUI can display information such as interactive text and graphics for the user to select via input device 210.

Display device 220 can display a variety of content that is intended to be viewed in a particular orientation. For example, display device 220 can display textual content that includes lines of text that are intended to be read in a particular direction. For example, in many countries text is read left to right and from top to bottom, where the left to right reading direction of the text defines a horizontal axis for interpreting lines of text. The same methods are of course also applicable without limitation for other languages with different reading direction such as right-to-left or top-to-bottom.

The intended content orientation is usually implicit, for example when the content is provided as a stream of text or HTML for rendering on the device based on text and language properties, or for an image or video file where the default orientation for pixel data is based on the file format specification, It is also possible that an explicit orientation is provided, for example metadata in an image or video specifying an orientation, for example based on the direction of gravity at the time the image was taken as detected by a photo camera's built-in accelerometer, or a specific orientation that was set manually by the user in image editing software. Another alternative is that the intended content orientation can be determined heuristically based on the content, for example a scanned image or fax that may be sideways or upside down. The user may also be able to manually override the content orientation, for example through a "rotate" command in an application. Once a desired content orientation has been determined using any method, the system can then use that information to orient it appropriately for display.

Display device 220 can also display image or video content that is intended to be viewed in a particular orientation. For example display device 220 may be configured to display, without limitation, a movie, a video game, a still image, a word processing document, visual output from an application program, or a set of presentation slides. Video content may include elements that define vertical and horizontal axes for the displayed movie implicitly or explicitly, or the system can attempt to heuristically derive a preferred orientation. For example, objects moving under the influence of gravity define a vertical axis and a downward direction for the movie as do depictions of people and animals standing or walking. Lines of text in subtitles may define a horizontal axis. Displays of level surfaces in the video content (e.g. table, room floors, and the ground) and lateral movements of characters can define horizontal axes for video content.

Input device 210 is also operatively coupled to computing device 240. In one embodiment, the user can provide input to computer system 200 by interacting with GUI elements for a system application via input device 210. Input device 210 can be a touch sensing device configured to receive an input from a user's touch or a touch gesture, or configured to receive a user's touch or touch gesture from an external touch device (e.g., stylus device) and to send the touch information to computing device 240. In turn, computing device 240 can execute an operation associated with the touch information. The touch sensing device can be, for example and without limitation, a capacitive sensing device, a resistive sensing device, a surface acoustic wave sensing device, a pressure sensing device, an optical sensing device, and other similar types of sensing devices.

Input device 210 can be a touch screen device that overlays display device 220. The touch screen device can be integrated with display device 220, or it may be a separate component device from display device 220. Positioning of the touch screen device over or in front of display device 220 facilitates the user's manipulation of the GUI for the system application via one or more touch gestures (e.g., finger gestures or an external touch device). For instance, the user can press a button displayed by the GUI or drag an object in the system application from one end to another end of display device 220 using finger gestures on the touch screen.

Imaging device 230 is also operatively coupled to computing device 240. Imaging device 230 may include an image sensor that receives information describing objects and converts the information to a format that can be processed by computing device 240.

In an embodiment of the imaging device, the image sensor can be an optical sensor that captures visible or invisible (e.g. infra red and ultraviolet) light reflected or emitted by objects. The optical sensor device can be, for example and without limitation, a charged coupled device (CCD), or an active semiconductor sensing device such as a complementary metal oxide (CMOS) sensor. The optical sensor may be a stand alone device or may be integrated with a signal processing device or processing the captured images. The optical sensor may utilize ambient light from the environment or may use light from a transmitting device such as a laser scanner or infrared LED.

The system and method is not limited to being practiced with optical images. Imaging device 230 may use other types of sensors. One of skill in the relevant arts will appreciate based on the teachings herein that various image sensors can be used. For example, imaging device 230 can employ a sound sensor for capturing sonic images, electromagnetic radiation such as radio waves, microwaves, or x-rays (e.g., back scatter images), or a heat sensor for capturing thermal images.

Computing device 240, display device 220, input device 210 and the imaging device 230 of computer system 200 are shown in FIG. 2 as separate units, operatively coupled together. Two or more of the devices of computer system 200 may be provided in an integrated unit. For example, display device 220, computing device 240, imaging device 230, and input device 210 can all be part of a mobile device, with the mobile device including an on board processor serving as the processor for computing device 240, a flat screen display with an overlaying touch screen serving as display device 220 and input devices 210, respectively, and an integrated camera serving as imaging device 230.

An embodiment of content orienting system 300 will be discussed with reference to FIGS. 2 and 3. FIG. 3 shows an example content orienting system 300 suitable for practicing an embodiment. Exemplary content orienting system 300 includes image capturing module 302, feature identifying module 304, user orientation determining module 306, content orientation determining module 308, orientation comparison module 310, and orientation changing module 312. Portions of content orienting system 300 may be included in one or more components of computer system 200. For example, content orienting system 300 may be included in computing device 240 of computer system 200.

Image capturing module 302 may be configured to capture images of a user positioned to view or direct the display of content on a display device. The images may be of various types, including, but not limited to, still video images, moving images, sound based images (e.g. ultrasound images), thermal images, and x-ray back scatter images.

The image capturing device may include mechanisms to provide an enlarged field of view such as wide-angle optics, a movable lens, or a movable sensor, to help locate the user's position when the user is not directly facing the device.

Feature identifying module 304 may be configured to identify features associated with one or more users, as well as locations and orientations of the identified features in a captured image. The identified features may include, without limitation, facial features, a partial or complete outline of a user's face, a user's torso, or a complete or partial outline of a user's body.

User orientation determining module 306 may be configured to identify a user orientation axis for a user based on features identified in a captured image. A user orientation axis has an orientation representing the angle of a line defined by one or more identified features and a direction along the line. For example, a user's left and right eye can define a user orientation axis that lies parallel to a line passing through the user's left and right eyes, and that is directed from left to right.

Content orientation determining module 308 may be configured to identify an orientation axis for content provided for display on a display device, such as display device 220. Examples of content orientations axes determined by content orientation determining module 308 may include, without limitation, orientation from left to right along lines of text, and horizontal left to right and vertical up to down orientations for video content or still images from a movie, video game, or camera. The content orientation can be specified in any of various ways, including without limitation implicitly or explicitly in the data to be displayed, determined by heuristics based on data content, or set specifically by the user via a "rotate" option override.

Orientation comparison module 310 may be configured to generate an output signal representative of a comparison between a user orientation axis for a user viewing or controlling the display of content on a display, and an orientation axis for the content to be displayed.

Orientation changing module 312 may be configured to change the orientation of content for display on a display device based on the comparison of the orientation for the user relative to the orientation of the display device and the orientation of the content provided for display.

Exemplary methods will now be described. For ease of explanation, the exemplary methods will be described with respect to computer system 200 of FIG. 2 and content orienting system 300 of FIG. 3. The descriptions of the methods will reveal additional features and configurations for embodiments of computer system 200 and content orienting system 300.

An exemplary method for orienting content on a display will now be described with reference to FIGS. 2, 3, and 4. FIG. 4 illustrates exemplary content orienting method 400 for orienting content on a display device. For ease of explanation, method 400 is described with respect to computer system 200 of FIG. 2 and the content orienting system 300 of FIG. 3. One of skill in the art will recognize that the operation of method 400 is not limited to systems such as computer system 200 and content orienting system 300, but that such systems are merely referred to therein as examples.

In step 402 of exemplary content orienting method 400, one or more features of a user are identified in a captured image. Image capturing module 302 is configured to capture images of a user positioned to view or direct the display of content on display device 220. For example, the image capturing module may be configured to receive an optical image of a user from imaging device 230 and to store the image for further processing by components of orientation content orienting system 300.

In a further embodiment, image capturing module 302 may be configured to control the capturing of images by imaging device 230. For example image capturing module 302 can be configured to periodically capture and store images from imaging device 230, to configure the image capturing device such as adjusting focus, zoom, shifting the lens or sensor axis, selecting optical filters, or controlling an illumination device such as an infrared LED.

Feature identifying module 304 can be configured to identify features of a user in a captured image based on a comparison of the images of user to a collection of images of human features or algorithmic description. Feature database 314 can store a collection of images of user features. For example, feature database 314 may store images or properties of features such as, facial outlines, facial features such as eyes, noses, and chins, and body portions such as torsos and fully body outlines. User orientation determining module 306 may be configured to retrieve images of features from feature database 314 and to compute correlation indices for identification of features in a captured image based on a comparison of a captured image of a user with the retrieved feature images.

Feature identifying module 304 can be configured to compute a correlation index between the captured image and the one or more feature images, with each correlation index representing a confidence metric that indicates the degree of correspondence of a user feature in the captured image to a respective retrieved feature image. Feature identifying module 304 can be further configured to identify one or more feature matches in a captured image having a confidence metric exceeding a threshold value and to select one or more of the identified feature matches. Feature identifying module 304 can be configured to store the confidence metric corresponding to the identified features in feature database 314.

One of skill in the relevant art will understand based on the teachings herein that various techniques can be used to identify features in an image. For example, feature database 314 may store data corresponding to various features, and feature database may identify features by extracting data from a captured image and comparing the extracted data to feature identifying data retrieved from feature database 314. Feature identifying module 304 can be configured to generate and store a confidence that indicates a degree of correspondence of data associated with a feature in the captured image to a feature data retrieved from the feature database.

In step 404 of exemplary content orienting method 400, a user orientation axis is determined based on the identification of features in the captured image. User orientation determining module 306 determines the orientation of the user based on features identified in a captured image. For example, user orientation determining module 306 may determine one or more horizontal image axis and/or vertical axes based on the features identified in the captured image. A user orientation axis has both an orientation angle and a direction.

FIGS. 5A-5D shows example features identified in a captured image. In FIG. 5A-5D, features shown using solid lines indicate features identified in a captured image, while features shown using broken lines indicate features having an estimated location based on the identification of other features.

User orientation determining module 306 may be configured to identify a user orientation axis for the user in an image. A user orientation axis for a user is a directed line segment substantially parallel to and directed substantially along a line segment drawn from the left eye of the user and the right eye of the user. Other alternative and equivalent methods include without limitation an axis from the right eye to the left eye, an axis from the nose to the mouth, or other descriptions involving angles or planes describing the head or eye orientation in two-dimensional image space or three-dimensional space in relation to the image capturing or display device. The orientation of a user orientation axis will vary as the user repositions his head or face or moves the display or image capturing device. The user orientation can be described relative to the device or in absolute terms based on a different coordinate system.

User orientation determining module 306 may be configured to identify a user orientation axis by identifying features of a user's face. For example in FIG. 5A, image 502 represents an example captured image from which feature identifying module 304 has identified the locations and orientations of an outline of a user's face 504, left eye 506, right eye 508, nose 510, and lips 512. User orientation determining module 306 can be configured to identify a user orientation axis, which in this example is a horizontal axis 514 as lying on a line drawn from the identified location of the user's left eye to the identified location of the user's right eye. Alternatively, user orientation determining module 306 may be configured to determine the direction and orientation of the upwardly vertical axis 516 from one or more of the eyes, nose, lips, neck, and facial outline represented in image 502.

User orientation determining module 306 may be configured to identity one or both of orientation of the vertical axis 516 and the orientation of the horizontal axis 514 based on the identification of the location of a single eye. For example in FIG. 5B, image 518 represents an example captured image from which feature identifying module 304 has identified the locations and orientations of an outline 520 of a user's face, and the user's left eye 525. User orientation determining module 306 can estimate the location of the user's right eye 523 based on the location and orientation of the user's left eye 525 and the facial outline 520 and can identify one or both of the orientation of vertical axis 516 and the orientation of the horizontal axis 514 as described above.

User orientation determining module 306 may be configured to identity the orientation of the horizontal axis 514 based on the orientation and direction of the left eye 525 and to omit the step for estimating a location of the right eye 523. For example, user orientation determining module 306 may be configured to identify a horizontal axis 514 as lying along a long dimension of a left eye 525 shown in image 518, and the orientation of the vertical axis 516 as lying along a short dimension of the identified eye. In a further embodiment, user orientation determining module 306 can identify whether the identified eye is a left or right eye and can determine a left to right orientation for the identified user orientation axis and/or an up and down direction for the identified vertical axes.

User orientation determining module 306 may be configured to identify an outline of a user's face in a captured image and to identify one or more axis based on the identified outline. For example in FIG. 5C, image 524 represents a captured image in which feature identifying module 304 has identified the orientation of an outline 526 of a user's face. User orientation determining module 306 may identify a width or height dimension of the user's face in the identified outline, and may identify a corresponding vertical axis 516 or horizontal axis 514 based on the identified height and width dimensions.

In a further embodiment, user orientation determining module 306 may identify user orientation axes based on identifying a partial outline of a face in a captured image of a user's face. For example in FIG. 5D, image 528 represents a captured image in which feature identifying module 304 has identified the top 530 of a user's head in the image. User orientation determining module 306 may be configured to identify a horizontal axis 514 or a vertical axis 516 from the identified partial outline, or top 530 of the user's head.

In the above described embodiments, user orientation determining module 306 identifies one or more axes based on identifying features that change orientation with a change in orientation of a user's face in a captured image. Embodiments are not limited to determining the orientation based on the identifying features of a user's face.

User orientation determining module 306 may be configured to identify orientation axes of the user based on identifying parts or all of the user's body in a captured image. For example, feature identifying module 304 can be configured to identify one or more features of the body of a user in a captured images, where the body features may include, but are not limited to, the user's neck, upper torso, arms, legs, or overall silhouette. User orientation determining module 306 can be configured to identify a user orientation axis associated with the identified body features.

In a further embodiment, a user orientation axis for a user may be identified by identifying features of clothing or equipment of a user in an image. For example, feature identifying module 304 can be configured to identify hats, neckties, shirt collars, buttons, spectacles, stethoscopes, or other devices or articles of clothing worn or attached to the user in a captured image. User orientation determining module 306 can be configured to identify one or more vertical axes and horizontal axes of the user based on the location and orientation of the identified articles.

User orientation determining module 306 can identify a user orientation axis from an axis associated with a user feature by using geometric relationships between the identified axis and the user orientation axis. For example, the user orientation module can identify a user orientation axis as being parallel to an identified horizontal axis and perpendicular to an identified vertical axis.

The content can be displayed on a display device. Computing device 240 receives content and displays the content on display device 220. For example, content can be provided to computing device as a document, file, or as a content stream. Computing device 240 may be configured to convert data from the document, file, or content stream to a form compatible with display device 220, and to provide the converted data to display device 220.

Display device 220 displays content on the display device 220 with an initial orientation. For example, display device 220 may display lines of text such that the lines of text are aligned along the width of the display. Alternatively, computing device 240 may determine the orientation of display device 220 and may arrange the document data provided to display device 220 so that the lines of text are oriented on display device 220 based on the orientation of the display device. For example, computing device 240 may process data from orientation sensors (e.g. accelerometer, gyroscopic, and compass sensors) to determine the orientation of display device 220.

In step 406 of exemplary content orienting method 400, an orientation axis corresponding to an orientation direction of a screen content is defined. Content orienting determining module 308 identifies an orientation axis for content to be displayed on display device 220. Content orientation determining module 308 may be configured to determine orientation axes for the content relative to an axis of the display, such as the width or length axis of display device 220.

Various methods of identifying an orientation axis in content may be used. The methods used may vary with the type of content or a type of document containing the content. Content orientation determining module 308 may be configured to identify that content for display is one or more lines of text, and to identify an orientation axis for the content as corresponding to the lines of text. Content orientation determining module 308 may be configured to recognized content lines of text by identifying sequences of characters within the content. For example, content orientation can recognize lines of text by identifying sequences of alphanumeric characters and/or sequences of line or paragraph delimiting characters within the content. Alternatively, content orientation determining module 308 can identify text content by examining the file names for files containing content. For example, content orientation determining module 308 may be configured to identify file names ending in ".txt" as containing lines of text.

Content orientation determining module 308 may be configured to identify an orientation axis for content based on orientation information included within the content. For example, content such as word processing documents, presentation documents, and spreadsheets may contain information indicating an intended orientation on a display. The information may describe the documents as being "landscape" mode documents for which a longer dimension of the document is intended to be displayed horizontally relative to a display, or as being "portrait" mode documents for which the longer dimension of the document is intended to be presented horizontally on a display. Content orientation can be based on metadata associated with the content, including without limitation examples such as EXIF orientation tags in image files, or annotations such as the "dir" attribute in HTML text.

Content orientation determining module 308 may be configured to identify an orientation axis for content based on aspect information associated with the content. For example, video content from a video clip or video game may include aspect information identifying vertical and horizontal dimensions (e.g. 640×360 or 640×480) or ratios of the vertical and horizontal dimensions (e.g. 4:3 or 16:9) for the video content. Content orientation determining module 308 can identify horizontal and vertical content orientation axes of the content for displaying on a fixed display as corresponding to the horizontal and vertical dimensions of the display, respectively.

The above described methods for identifying methods for identifying orientation axes for content are examples, and one of skill in the relevant arts will be able to envision, based on the teachings herein, additional means of identifying a content orientation axis for content of various types.

In a further embodiment, content orientation determining module 308 may receive user input from input device 210 indicating an orientation axis for content provided for display on display device 220. For example, input device 210 may be a touch screen device, and content orientation determining module 308 may be configured to receive user input from the touch screen device indicating an orientation axis for the content. A user may perform a gesture on the touch screen device that indicates an orientation and a direction, and content orientation determining module 308 may be configured to identify the orientation and direction of the gesture as the orientation and direction of an axis for the content. For example, content orientation determining module 308 may be configured to identify a direction of an orientation axis from pinch, spread, fling or swipe gestures performed on the touch screen device, or selected by the user from menus or toolbar buttons such as a "rotate left/rotate right" method.

In another embodiment, feature identifying module 304 may identify an orientation and direction of a user's feature, and content orientation determining module 308 may use the identified orientation and direction to specify an axis for content. For example, based on an identified orientation and direction of a user's hand and arm, content orientation determining module 308 may identify an orientation axis for the displayed content.

The above described methods receiving user input are only examples, and one of skill in the relevant art and apprised of the information detailed herein will understand that alternate methods of receiving user input to identify content orientation axes may be used.

In step 408 of exemplary content orienting method 400, a determination is made as to whether the content orientation axis and the user orientation axis are parallel or perpendicular. The orientation of provided content on a display is compared to the user orientation axis of the user in relation to the orientation of the display device.

A comparison of orientation axes may be made if the orientation axes share a common reference. For example, in the above described embodiments, the content orientation determining module 308 identifies a content orientation axes relative to an axis of the display. Content orientation determining module 308 determines the user orientation axis of the user relative to the same axis of the display that serves as a reference for the content orientation axis by determining the relative orientations of the display and the image sensor and using coordinate transform algorithms known in the art.

The image sensor for capturing user images may have a known orientation relative to the display. Imaging device 230 and display device 220 may be integrated into a single device such that the orientation of the image sensor of imaging device 230 has a fixed relationship with the display. In another embodiment, imaging device 230 and display device 220 may be separate devices, with the image sensor aligned to have a known orientation relative to display device 220. In a further embodiment, the image sensor of imaging device 230 may have a known orientation relative to terrestrial horizontal and vertical axes, and the orientation of the display may be determined using one or more orientation determining components integrated into display device 220. For example, display device 220 may be part of a mobile device configured to determine the orientation of the mobile device, using one or more of an onboard accelerometer, compass, or gyroscope using one or more orientation determining techniques known to those skilled in the relevant art. The image device may be a camera or set of cameras installed in a room's walls or ceiling that can view the user and device and determine an appropriate relative orientation.

Orientation comparison module 310 may be configured to compare the user orientation axis and the content orientation axis to a common reference. For example, orientation comparison module 310 can be configured to receive information describing one or more of the orientation of the image sensor that captured the user image relative to the display, the orientation of the display, the orientation of a user orientation axis, and the orientation of an axis for the content, and to generate an output signal based on a comparison of the user orientation axis an axis for the content, with each axis referenced to common axis of the display.

In step 410 of exemplary content orienting method 400, the orientation direction of the screen content is changed to be substantially along the user orientation axis based on the determination of whether the content orientation axis and the user orientation axis are parallel or perpendicular. If the content orientation axis and the user orientation axis are parallel, the orientation is not changed. If the content orientation axis and the user orientation axis are perpendicular, the orientation direction of the screen content is changed to be substantially along the user orientation axis.

In one embodiment, orientation changing module 312 may be configured to change the orientation axis of provided content as displayed on display device 220 to be more closely aligned with an orientation of a corresponding user orientation axis.

For example, orientation comparison module 310 may generate an output signal corresponding to a comparison between an identified user orientation axis from the left eye to the right eye for a user viewing or controlling the display of content on display device 220 and a content orientation axis directed from left to right along lines of text for the content. Orientation changing module 312 may be configured to modify the content information provided to display device 220 so that the lines of text are oriented to be substantially parallel to the user orientation axis of the user and so that the lines of texts are oriented such that the beginning of the lines of text is towards the user's left eye and the ends of the lines of texts are towards the user's right eye. For example, orientation changing module 312 may apply algorithms for rotation of axes of graphics data to the data provided to display device 220.

The direction of the content orientation axis of the text may be reversed or rotated to conform to the languages in which text is read from right to left or from top to bottom, and orientation changing module 312 may be configured to modify the content information provided to display device 220 so that the lines of text are oriented to be substantially parallel to the user orientation axis of the user and so that the lines of texts are oriented such that the beginning of the lines of text is towards the user's right eye and the ends of the lines of texts are towards the user's left eye, or equivalently so that vertical text is oriented parallel to the user's forehead-to-chin axis.

Display device 220 may be configured to select between two or more discrete display orientation modes. For example, display device 220 may be configured to select between a landscape and a portrait mode for displaying content. Alternatively, display device 220 may be configured to select between portrait up, portrait down, landscape left and landscape right display modes. Alternatively, display device 220 may support smooth rotation at an arbitrary angle and select an intermediate orientation to match the user's orientation Orientation changing module 312 may select the one of the discrete display orientation modes of display device 220 in which the orientation of the provided content on the display most closely corresponds to an identified user orientation axis of the user.

An example embodiment for orienting content by selecting a discrete display orientation mode will now be discussed with reference to FIG. 6. In the example, a display having four selectable orientation modes will be shown. One of skill in the relevant will understand based on the description herein that embodiments may use a display device having two or more selectable orientation modes, or that supports arbitrary rotation angles.

In step 412, the screen content is displayed on the mobile device 620. The orientation direction of the screen content may have been changed to be substantially along the user orientation axis.

Figure 6:
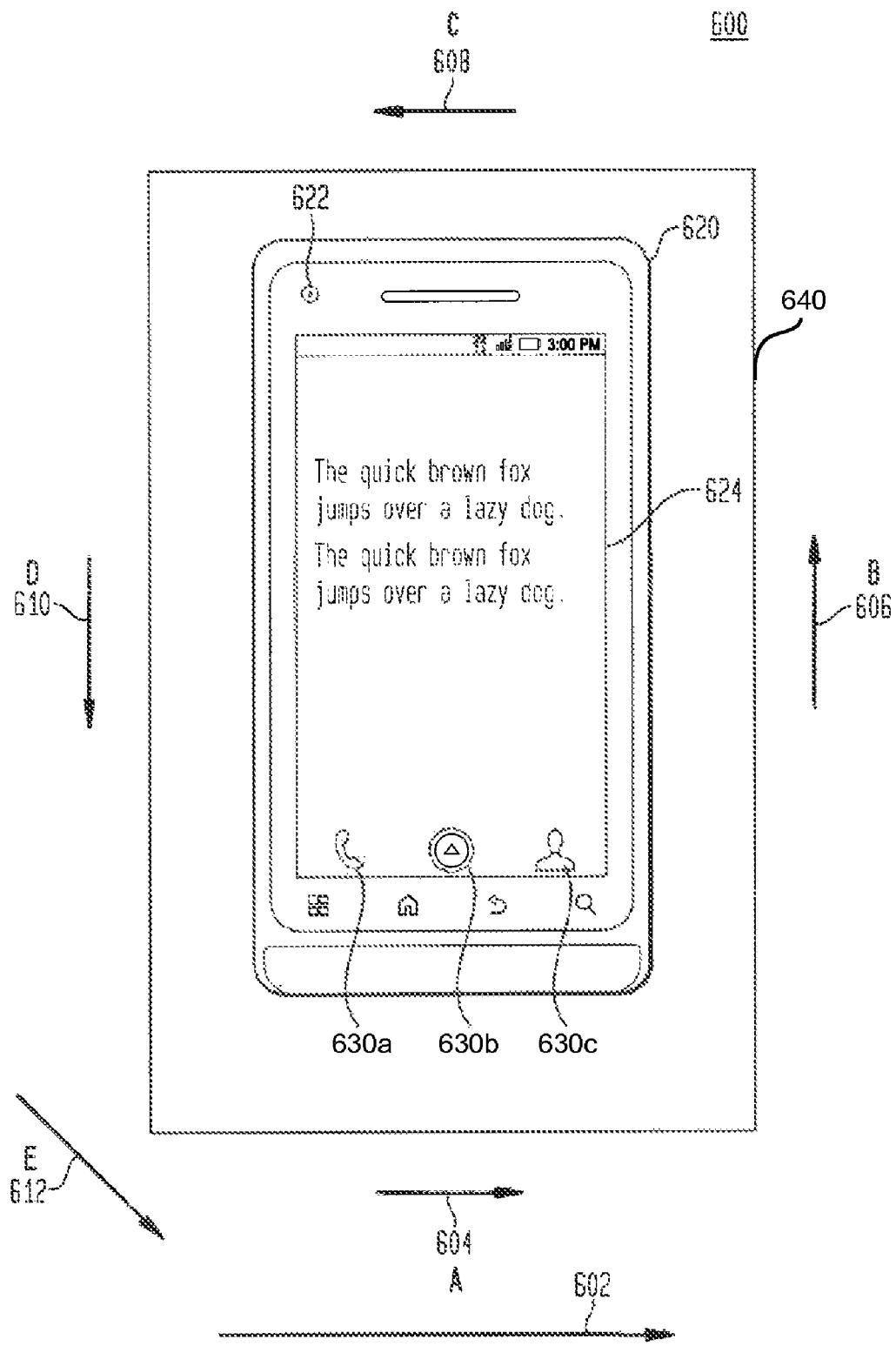
FIG. 6 is an illustration of an example mobile device in which embodiments can be implemented.
Figure 7:
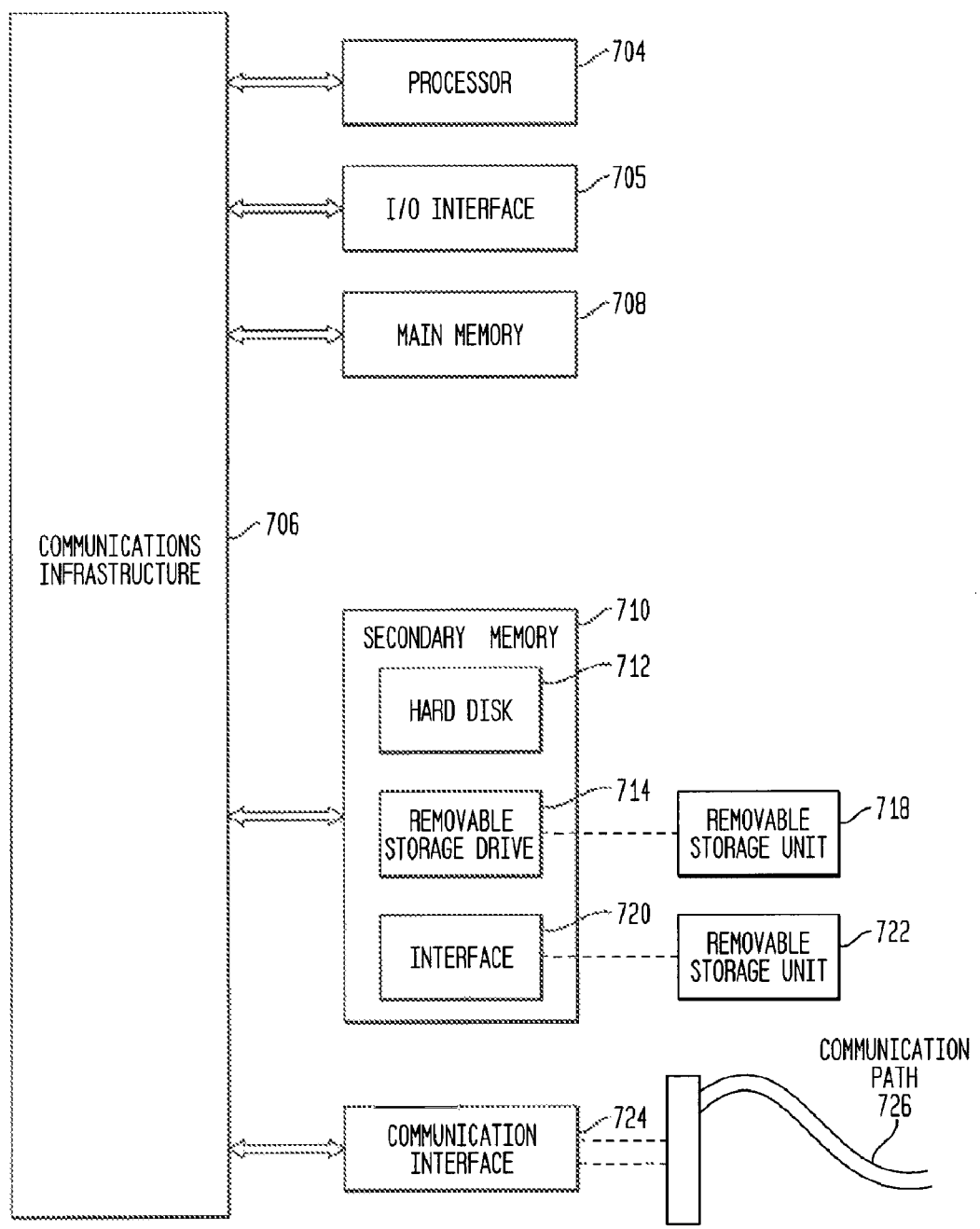
FIG. 7 is an illustration of an example computer system in which embodiments can be implemented.

FIG. 6 shows a mobile device 620 having a flat panel display device 624, an image sensor 622, and control buttons 630*a-c*. Mobile device 620 is shown lying face up (i.e., display up) on a horizontal surface 640. Mobile device 620 includes a content orienting system having a content orienting module 300 configured as described herein.

As shown in FIG. 6, display device 624 may display lines of text oriented parallel to content orientation axis 602. Display device 624 can operate in one of four content orienting modes, including: a "portrait up" mode, in which lines of text are oriented along the width dimension of the mobile device, in a left to right direction as shown in FIG. 6; a "portrait down" mode in which lines of text are inverted relative the "portrait up" mode and are oriented along the width dimension of the mobile device 620 with successive lines of text advancing up from the bottom of display 620; a "landscape left" mode in which lines of text are oriented along the length dimension of mobile device 620, flowing away from control buttons 630*a-c*; and a "landscape right" mode in which lines of text are oriented along the length dimension of mobile device 620, flowing towards control buttons 630*a-c*. In addition, the content may also be mirrored in addition to being rotated, for example if the display device is transparent and is viewable from both sides.

For a viewer located at location A and leaning over mobile device 620, the viewer's image as captured by sensor 622 will have user orientation axis 604. As the content orientation axis and the user orientation axis detected by the mobile device correspond in orientation and direction, the content orienting module 300 of mobile device 620 will remain in the "portrait up" display orientation mode.

If the viewer moves to location B and leans over mobile device 620, the viewer's image as captured by sensor 622 will have user orientation axis 606. As the content orientation axis 602 and the user orientation axis 606 detected by the mobile device do not correspond in orientation and direction, the content orienting module of mobile device 620 will select a new display mode for display 624, namely the "landscape left" mode, resulting in the text displayed on display 620 being properly oriented for the viewer at location B.

If the viewer moves to location C and leans over mobile device 620, the viewer's image as captured by sensor 622 will have user orientation axis 608. As the content orientation axis 602 and the user orientation axis 608 detected by the mobile device do not correspond in orientation and direction, the content orienting module of mobile device 620 will select a new display mode for display 624, namely the "portrait down" mode, resulting in the text displayed on display 620 being properly oriented for the viewer at location C.

If the viewer moves to location D and leans over mobile device 620, the viewer's image as captured by sensor 622 will have user orientation axis 610. As the content orientation axis 602 and the user orientation axis detected by the mobile device do not correspond in orientation and direction, the content orienting module of mobile device 620 will select a new display mode for display 624, namely the "landscape right" mode, resulting in the text displayed on display 620 being properly oriented for the viewer at location D.

At intermediate locations, for example at location E where the user's user orientation axis 612 does not correspond exactly to a content orientation axis produced in any of the available display modes, the content orientation module 300 can be configured to select a display mode based on selecting the best matching orientation out of the supported orientation modes. Alternatively, the device may align the content with the user's user orientation axis at an intermediate angle, producing a smooth rotation effect as the user moves position or reorients the device.

Content orientating system 300 can be configured to detect that a variety of conditions are met prior to changing the orientation of content for viewing.

Content orientating system 300 can maintain a current orientation of content displayed on display device 220 if a confidence metric for identifying a feature in an image does not exceed a threshold value. For example, feature user orientation determining module 306 may store identified user orientation axes with a corresponding determined confidence coefficient for recognizing features in an image used to identify the user orientation axis, or store a series of such detected user orientations and confidence coefficients at various points in time to establish a history of recent user orientations and movements. Content orientating system 300 may be configured to orient content based on a previously identified user orientation axis in response to a determination that the confidence coefficient associated with a current user orientation axes does not exceed a threshold value. Alternatively, content orientating system 300 may be configured to identify the orientation of display device 220 using sensor data (e.g. accelerometer or gyroscope data) and to orient content display based on the identified display device orientation in the absence of high confidence user orientation data.

Content orientation system 300 may be configured to inhibit a change in the orientation of content on display device 220 in response to user input. For example, orientation changing module 312 may be configured to respond to user input indicating that the content orientation should be locked, by maintaining a current orientation of the content on the user display. An orientation lock may allow a user to maintain the orientation of content on the screen while tilting the user's head or the device to inspect features of the content, or to rotate content independently of the device or user orientation.

Various aspects of the embodiments described herein may be implemented in software, firmware, hardware, or a combination thereof. The methods illustrated by flowchart 400 of FIG. 4 can be implemented in content orienting system 300. Various embodiments are described in terms of this example. After reading this description, it will become apparent to a person skilled in the relevant art how to implement embodiments described herein using other computer systems and/or computer architectures.

In an embodiment, content orienting system 300 includes one or more processors, such as processor 704. Processor 704 may be a special purpose or a general-purpose processor. Processor 704 is connected to a communication infrastructure 706 (e.g., a bus or network).

Content orienting system 300 may also include a main memory 708, preferably random access memory (RAM), and may also include a secondary memory 710. Secondary memory 710 can include, for example, a hard disk drive 712, a removable storage drive 714, and/or a memory stick. Removable storage drive 714 can comprise a floppy disk drive, a magnetic tape drive, an optical disk drive, a flash memory, or the like. The removable storage drive 714 reads from and/or writes to a removable storage unit 718 in a well-known manner. Removable storage unit 718 can include a floppy disk, magnetic tape, optical disk, etc. which is read by and written to by removable storage drive 714. As will be appreciated by persons skilled in the relevant art, removable storage unit 718 includes a computer-readable storage medium having stored therein computer software and/or data.

In alternative implementations, secondary memory 710 can include other similar devices for allowing computer programs or other instructions to be loaded into content orienting system 300. Such devices can include, for example, a removable storage unit 722 and an interface 720. Examples of such devices can include a program cartridge and cartridge interface (such as those found in video game devices), a removable memory chip (e.g., EPROM or PROM) and associated socket, and other removable storage units 722 and interfaces 720 which allow software and data to be transferred from the removable storage unit 722 to computer system 200.

Content orienting system 300 can also include a communications interface 724. Communications interface 724 allows software and data to be transferred between computer system 200 and external devices. Communications interface 724 can include a modem, a network interface (such as an Ethernet card), a communications port, a PCMCIA slot and card, or the like. Software and data transferred via communications interface 724 are in the form of signals, which may be electronic, electromagnetic, optical, or other signals capable of being received by communications interface 724. These signals are provided to communications interface 724 via a communications path 726. Communications path 726 carries signals and may be implemented using wire or cable, fiber optics, a phone line, a cellular phone link, a RF link or other communications channels.

In this document, the terms "computer program medium" and "computer-readable medium" are used to generally refer to media such as removable storage unit 718, removable storage unit 722, and a hard disk installed in hard disk drive 712. Computer program medium and computer-readable medium can also refer to memories, such as main memory 708 and secondary memory 710, which can be memory semiconductors (e.g., DRAMs, etc.). These computer program products provide software to computer system 200.

Computer programs (also called computer control logic) are stored in main memory 708 and/or secondary memory 710. Computer programs may also be received via communications interface 724. Such computer programs, when executed, enable computer system 200 to implement embodiments described herein. In particular, the computer programs, when executed, enable processor 704 to implement processes described herein, such as the steps in the methods 400 of FIG. 4, discussed above. Accordingly, such computer programs represent controllers of computer system 200. Where embodiments are implemented using software, the software can be stored in a computer program product and loaded into computer system 200 using removable storage drive 714, interface 720, hard drive 712 or communications interface 724.

Based on the description herein, a person skilled in the relevant art will recognize that the computer programs, when executed, can enable one or more processors to implement processes described above, such as the steps in exemplary method 400 illustrated by the flow chart of FIG. 4. The one or more processors can be part of a computing device incorporated in a clustered computing environment or server farm. Further, the computing process performed by the clustered computing environment such as, for example, the steps in the method 400 may be carried out across multiple processors located at the same or different locations.

Embodiments are also directed to computer program products including software stored on any computer-readable medium. Such software, when executed in one or more data processing device, causes a data processing device(s) to operate as described herein. Embodiments employ any computer-usable or -readable medium, known now or in the future. Examples of non-transitory computer-readable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.). Additional examples of computer readable mediums include communication mediums (e.g., wired and wireless communications networks, local area networks, wide area networks, intranets, etc.).

For example, a computer program product may include a computer-readable medium having computer program logic recorded thereon. The computer program logic may be for enabling a processor to execute operations on a computer system to carry out operations of exemplary method 400 described herein. For example, the computer program logic may include first computer readable program code that enables a processor to execute methods according to embodiments.

The computer logic may include: first computer readable program code that enables a processor to identify identifying one or more features of a user in a captured image; second computer readable program code that enables a processor to identify a user orientation axis indicating the user's orientation in the captured image based on the one or more identified features; third computer readable program code that enables a processor to identify an orientation axis for content provided for display; and fourth computer readable program code that enables a processor to rotate the content on a display such that a rotated identified content orientation axis for the content on the display is substantial parallel to the identified user orientation axis. In a further embodiment, the computer logic may include fifth computer readable program code that enables a processor to calculate a confidence metric associated with the identifying of the one or more features in the captured image.

As would be understood by a person skilled in the art based on the teachings herein, several variations of the above described features can be envisioned. These variations are within the scope of embodiments. For example, one skilled in the art can envision several variations to computer system 200, content orienting system 300, and exemplary method 400 of FIGS. 2, 3, and 4. For the purpose of illustration only and not limitation, example variations will now be described.

For example, a variation may include varying additional features of displayed content based on identifying features in a captured image. In an embodiment, feature identifying module 304 may be configured to determine whether features for more than one person are identified in a captured image, and orientation module 312 may be configured to change an operating mode of software based on the identification of features for more than one person in the captured image. For example, the content for display on display device 220 may include instant message notifications displayed by an instant messaging program. Orientation changing module 312 can be configured to inhibit the display of instant message notifications in response to an identification of features of more than one person identified in a captured image. In another variation, orientation changing module may inhibit the display of email message in response to feature identifying module 304 identifying the features of more than one person in a captured image.

Orientation changing module 312 may be configured to control the display of a screen saver or activating a security mode on display device 220 in response to the identification of features of a user and the change history of such identified features over time. For example, activation of the screen saver or security mode can be delayed or inhibited if the user is detected as being continuously present in front of the device, for example while watching a movie or engaging in a video conference. In a further embodiment, orientation changing module 312 may be configured to place computing device 240 and display device 220 in a security mode in response to feature identifying module 304 determining that user features are not identified in a captured display image, for example if the time series of identified features indicate that the user has moved away from the device or has set it aside out of view.

User orientation determining module 306 may be configured to identify an area of focus on a display based on identifying the orientation of one or both of a user's eyes in a captured image. Orientation changing module 312 can be configured to the display of content of the display based on the identified area of focus of the user's eyes on the display.

Feature identifying module 304 can be configured to identify gestures based on movement of features in an image, and orientation changing module 312 can be configured to change the appearance of the displayed content in response to the identified gestures. For example, orientation changing module 312 may be configured to rotate the content on the display 90 degrees clockwise or counter clockwise in response to an identification in a captured image of a right eye blink or a left eye blink by a user. In another variation, orientation changing module 312 may be configured to lock the display in a current display orientation in response to feature identifying module 304 identifying a rapid eye blink in an image of the user. Hand signals or other gestures such as head or eyebrow movement could be used for the same purpose.

While various embodiments have been described above, it should be understood that they have been presented by way of example only, and not limitation. It will be understood by those skilled in the relevant art that various changes in form and details can be made therein without departing from the spirit and scope of the embodiments described herein. It should be understood that this description is not limited to these examples. This description is applicable to any elements operating as described herein. Accordingly, the breadth and scope of this description should not be limited by any of the above-described exemplary embodiments, but should be defined only in accordance with the following claims and their equivalents.

What is claimed is:

1. A method performed by a computing device having a processor, the method comprising:
identifying, by the computing device, one or more features of a user in a captured image on a mobile device;
calculating a confidence metric for the identifying of the one or more features;
accessing stored user orientation axes of pictures stored on the mobile device;
determining a user orientation axis of the captured image in response to determining that the confidence metric exceeds a threshold value and determining the user orientation axis of a stored picture in response to determining that the confidence metric does not exceed a threshold value;
defining a content orientation axis corresponding to an orientation direction of a screen content;
determining whether the content orientation axis and the user orientation axis are parallel or perpendicular;
changing the orientation direction of the screen content to be substantially along the user orientation axis based on the determination of whether the content orientation axis and the user orientation axis are parallel or perpendicular; and
displaying the screen content on the mobile device.

2. The method of claim 1, wherein the user orientation axis is substantially parallel to a line passing between a left eye position of the user and a right eye position of the user, based on the one or more features.

3. The method of claim 1, wherein the screen content includes a line of text, further comprising:
rotating the screen content to align the content orientation axis so that a beginning of the line of text is positioned towards the left eye.

4. The method of claim 1, wherein the screen content includes a line of text further comprising:
rotating the screen content to align the content orientation axis so that an end of the line of text is positioned towards the right eye.

5. The method of claim 1, wherein the mobile device includes a camera and wherein the method further includes capturing the image using the camera.

6. The method of claim 1, wherein identifying one or more features includes identifying the one or more features from within an image of a partial outline of the user's face.

7. The method of claim 1, wherein the one or more features includes an outline of the user's face, and wherein identifying the user orientation axis is performed by identifying the user orientation axis based on the outline.

8. The method of claim 1, wherein the one or more features includes an outline of one or more individual facial features, and wherein identifying the user orientation axis is performed by identifying the user orientation axis based on the orientation of the outlines of the individual facial features.

9. The method of claim 1, further comprising:
selecting a display orientation based on the change of detected orientations over time.

10. The method of claim 1, further comprising:
storing a history of confidence metrics based on pictures taken at one or more time intervals; and
selecting a display orientation based on the change of detected orientations and confidence metrics over time.

11. The method of claim 1, wherein aligning the content orientation axis includes altering data sent to the mobile device to change the orientation of the displayed content.

12. The method of claim 1, further comprising:
selecting one of a plurality of predefined content display modes to align.

13. The method of claim 1, wherein defining a content orientation axis is performed by obtaining orientation information based on information included in the content and defining the content information based on the orientation information.

14. A non-transitory computer storage medium encoded with a computer program, the program comprising instructions that when executed by one or more computers cause the one or more computers to perform operations comprising:
identifying one or more features of a user in a captured image;
calculating a confidence metric for the identifying of the one or more features;
accessing stored user orientation axes of pictures stored on the mobile device;
determining a user orientation axis of the captured image in response to determining that the confidence metric exceeds a threshold value and determining the user orientation axis of a stored picture in response to determining that the confidence metric does not exceed a threshold value;
defining a content orientation axis corresponding to an orientation direction of a screen content;
determining whether the content orientation axis and the user orientation axis are parallel or perpendicular
changing the orientation direction of the screen content to be substantially along the user orientation axis based on the determination of whether the content orientation axis and the user orientation axis are parallel or perpendicular; and
displaying the screen content.

15. The non-transitory computer storage medium of claim 14, wherein the user orientation axis is substantially parallel to a line passing between a left eye position of the user and a right eye position of the user, based on the one or more features.

16. The non-transitory computer storage medium of claim 14, wherein the operations further comprise:
calculating a confidence metric for the identifying of the one or more features based on the captured image.

17. The non-transitory computer storage medium of claim 16, wherein the operations further comprise:
performing the aligning the content orientation axis in response to the calculated confidence metric exceeding a threshold value.

18. A system comprising:
one or more computers; and
a computer-readable medium coupled to the one or more computers having instructions stored thereon which, when executed by the one or more computers, cause the one or more computers to perform operations comprising:
identifying one or more features of a user in a captured image;
calculating a confidence metric for the identifying of the one or more features;

accessing stored user orientation axes of pictures stored on the mobile device;

determining a user orientation axis of the captured image in response to determining that the confidence metric exceeds a threshold value and determining the user orientation axis of a stored picture in response to determining that the confidence metric does not exceed a threshold value;

defining a content orientation axis corresponding to an orientation direction of a screen content;

determining whether the content orientation axis and the user orientation axis are parallel or perpendicular changing the orientation direction of the screen content to be substantially along the user orientation axis based on the determination of whether the content orientation axis and the user orientation axis are parallel or perpendicular; and displaying the screen content.

* * * * *